Aug. 17, 1948.   W. F. ERTZMAN   2,447,321
ELECTRICAL DETECTOR NETWORK
Filed June 9, 1945

*INVENTOR.*
WILLIAM F. ERTZMAN
BY
E. C. Sanborn
*ATTORNEY*

Patented Aug. 17, 1948

2,447,321

UNITED STATES PATENT OFFICE 2,447,321

ELECTRICAL DETECTOR NETWORK

William F. Ertzman, Waterbury, Conn., assignor to The Bristol Company, Waterbury, Conn., a corporation of Connecticut Application June 9, 1945, Serial No. 598,596

4 Claims. (Cl. 171—95)

This invention relates to electrical detector networks, and more especially to a bridge system whereby changes in a unidirectional electrical potential of small magnitude may be caused to control an alternating potential and to render the magnitude and phase position of said alternating potential responsive to the intensity and polarity of said unidirectional potential. In the art of electrical measurement, especially in the control of self-balancing systems, whereby it is desired to effect in an electrical network such circuit changes as will tend to maintain said network in a balanced condition, it has heretofore been a conventional practice to utilize a galvanometer connected in said network and adapted to respond to said unbalanced condition, and thereby through suitable relay mechanism to actuate a servomotor for restoring a condition of balance. The relay mechanism may be either mechanical or electrical, or a combination of the two; and many expedients of this nature are known in the art. An example of a self-balancing instrument utilizing a mechanical relay system under the command of a deflecting galvanometer is found in U. S. Letters-Patent No. 965,824 granted to M. E. Leeds, July 26, 1910; while the combination electro-mechanical relay system is exemplified in U. S. Letters-Patent No. 2,082,109, granted to O. H. Hunt, June 1, 1937; and the purely electrical system is found in U. S. Letters-Patent No. 2,320,066 granted to F. B. Bristol, May 25, 1943. It will be observed that in each of the above disclosures, and in kindred examples known in the art, the command of the relay mechanism is subject to the displacement of an element in a deflecting galvanometer, and that, therefore, such methods of actuating servomotors will depend upon the circuit unbalance attaining sufficient magnitude to produce physical displacement of a moving element having appreciable inertia.

It is an object of the present invention to provide an electrical detector, responsive to minute electromotive changes such as characterize unbalance in electrical networks, and, without the interposition of moving parts, to provide control of electric power having sufficient magnitude for the operation of a circuit-balancing servomotor.

It is a further object to provide a detector circuit of the above nature which shall maintain a high degree of response sensitivity over a wide range of variation in voltage of the supply system.

It is a further object to provide a detector circuit of the above nature in which vacuum tubes may advantageously be operated at subnormal filament temperatures, thereby minimizing "drift" and indefinitely prolonging the life of the tubes.

In carrying out the purposes of the invention, in the embodiments herein illustrated, it is proposed to utilize an alternating current bridge network including the elements of a plurality of grid-controlled thermionic devices, interrelated in such a manner that such network may be brought to a condition of balance readily disturbed by changes in the unidirectional potential relationships of the grids in said tubes.

Other features and advantages of the invention will be hereinafter described and claimed.

Figure 1:
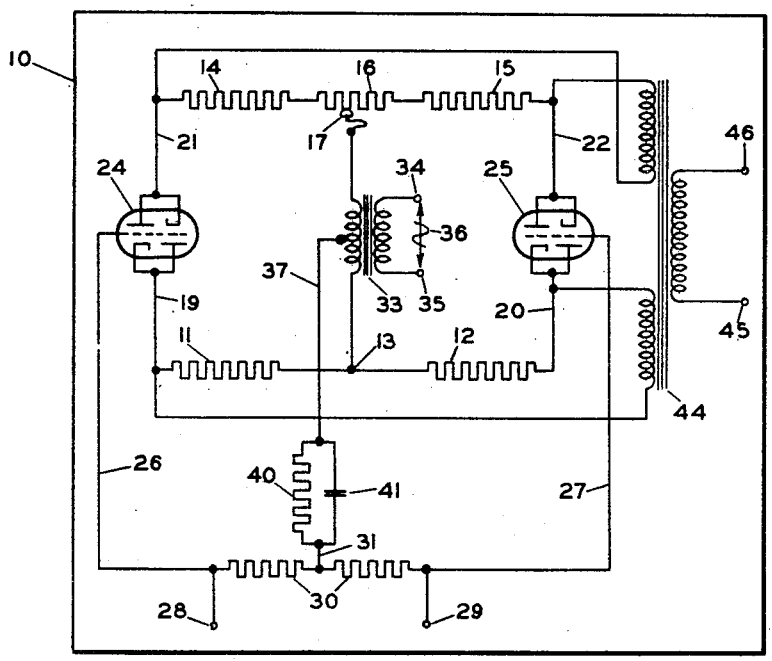
Fig. 1 is a diagrammatic representation of a bridge inverter network embodying the principles of the invention.

Referring now to the drawings:

The numeral 10 designates a bridge-inverter incorporating the principles of the invention, and including two resistors 11 and 12 of substantially equal value, connected, each at one extremity, to a common point 13, and two resistors 14 and 15, also of substantially equal value, connected each at one extremity to the terminals of a resistor 16 having a sliding contact 17 adapted by adjustment of its position to vary the resistance distribution between said contact and the free terminals of the resistors 14 and 15. The free terminals of resistors 11 and 12 are connected respectively to conductors 19 and 20, and the corresponding free terminals of resistors 14 and 15 to conductors 21 and 22.

A double-triode electron tube 24 is provided with two cathodes, two corresponding anodes, and a single control grid, the internal arrangement being such that each anode is specifically associated with a single cathode, to receive therefrom an electron flow as controlled by the single grid. The two elements of the electron tube 24 are connected with opposed polarity. That is to say, one cathode and the anode which normally receives an electron flow from the other cathode are both connected to the conductor 19, and similarly, the remaining cathode and anode are connected to the conductor 21. A double-triode tube 25, identical in all respects with the tube 24 has its anodes and cathodes similarly paired and connected to the conductors 20 and 22. To the control grids of the tubes 24 and 25 respectively are connected conductors 26 and 27, these being led to a pair of terminals 28 and 29, and also interconnected by a resistor 30, tapped at its midpoint and having attached thereto a conductor 31.

A transformer 33 having a primary winding connected to terminals 34 and 35 for energization from an alternating current source 36, is provided with a secondary coil wound for a low voltage (for example, of the order of 6 volts or less) and having a center tap, to which is connected a conductor 37. Between the conductors 31 and 37 is connected a parallel combination of a resistor 40 having a relatively high resistance value, and a capacitor 41 of relatively high capacitance value, said combination providing a high impedance to the flow of unidirectional current between said conductors, while offering a low impedance to the flow of alternating current.

An output transformer 44 is provided with two electrically identical primary windings mutually isolated, and having their terminals connected to the conductors 19—20 and 21—22 respectively. The secondary winding of said transformer 44 is connected to terminals 45 and 46.

Analysis of the diagram shown in Fig. 1 shows that the electrical network 10 comprises a symmetrical bridge having four impedance-arms, each including one of the resistors 11, 12, 14, 15, and a portion of the electron path through one or other of the double triodes 24 and 25. With the control grids, to which are connected the conductors 26 and 27 representing two opposite corners of the bridge, the remaining two opposite corners will be represented by the terminal 13 and the sliding contact 17; and it will be obvious that by adjusting the position of said contact along the slide-wire resistor 16, inequalities in tube characteristics may be compensated for, and the bridge given the symmetry consistent with a balanced condition.

Figure 2:
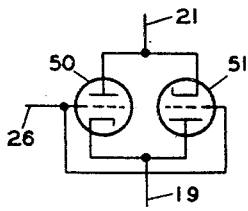
Figs. 2 and 3 show possible alternative arrangements of the electronic elements of the network.

The electron tubes shown in Fig. 1 are of the "double-triode" class, typical of which is that form known by the trade designation of "7F7." It is fully in keeping with the spirit of the invention, however, that equivalent other forms or combinations of grid controlled tubes may be substituted in the network. For example, as shown in Fig. 2, two simple triodes 50 and 51 may be interconnected in such a manner as to provide a full equivalent of the tube 24 shown in Fig. 1. For this purpose, the anode of each of said triodes is connected to the cathode of the other, the connecting leads in turn being connected to the conductors 19 and 21. The control grids of said triodes would both be connected to the conductor 26. An additional pair of triodes (not shown in the drawing) would be interconnected in a similar manner, and their anode-cathode leads connected to the conductors 20 and 22, respectively of Fig. 1, while both their control grids would be connected to the conductor 27.

Figure 3:
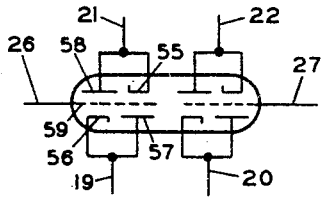

In Fig. 3 is shown the incorporation of the whole electronic system of the bridge network into a quadruple triode, comprising four cathodes with their corresponding anodes, together with two control grids, in a single envelope. One electrode section of the tube comprises two cathodes 55 and 56 and two anodes 57 and 58, with a common control grid 59, each anode being connected to the cathode whose emissions normally pass to the other anode, and the interconnecting leads connected to the conductors 19 and 21 of Fig. 1, the control grid being connected to the conductor 26. The other electrode section of said tube is identical with that just described, there being two pairs of interconnected cathodes and anodes, connected respectively to the conductors 20 and 22, and a common control grid connected to the conductor 27.

Figure 4:
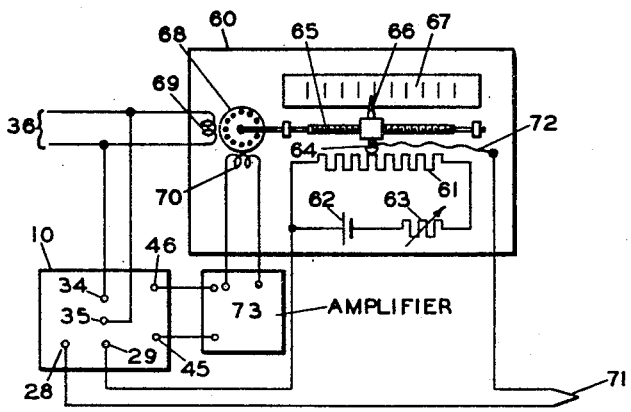
Fig. 4 is a diagram of a self-balancing potentiometer adapted to the purpose of pyrometry, and utilizing the present invention as a detector.

In Fig. 4 is shown an application of the invention to the control of a self-balancing potentiometer for the measurement of electromotive force developed by a thermocouple, and thereby of the temperature to which said thermocouple is exposed. A potentiometer instrument 60 comprises a slide-wire resistor 61 adapted to be supplied from a battery 62 with a direct current whose value may be regulated to a suitable value by means of an adjustable rheostat 63. Operatively engaging the slide-wire resistor 61 is a movable contact 64 adapted to be positioned along said wire resistor by means of a lead screw 65 and to have its translated position indicated by means of an index or pointer 66 in cooperation with a graduated scale 67. The lead screw 65 is adapted for rotation in either direction by means of a reversible alternating-current electric motor 68 having a squirrel-cage rotor rotatable in the field resulting from the interaction of two mutually displaced windings 69 and 70, the former of which may be continuously energized from the alternating-current source 36 referred to in Fig. 1. A thermocouple 71, exposed to the temperature to be measured has one of its terminals connected by means of a flexible lead 72 to the contact 64, and its other terminal, in series with the terminals 28 and 29, of the network 10, to one extremity of the slide-wire resistor 61.

An amplifier 73 is adapted to have impressed thereon the potential appearing between the terminals 45 and 46 of the network 10, and to apply to the winding 70 of the motor 68 a voltage of proportional magnitude and corresponding phase position. Said amplifier may, if desired, include in its network a capacitor or other conventional means whereby to introduce into its output voltage a fixed phase-shift, whereby the interaction of currents in the windings 69 and 70 of the motor 68 will cause optimum operating performance to be obtained.

In operation, an alternating potential from source 36 is impressed upon the input terminals 34—35, causing a similar potential of lower voltage, as determined by the ratio of the transformer 33, to be impressed between the connection point 13 and the sliding contact 17 in the bridge network. With a zero unidirectional potential between the terminals 28—29 there will be no difference of potential between the control grids of the tubes 24—25, and the bridge comprising the two resistance units 11—12 and the two resistance units 14—15 (each of the latter with a portion of the adjustable resistance 16) together with associated portions of the electron paths in said tubes, may, by manipulation of the movable contact 17 with respect to the slide-wire resistor 16, be adjusted to a condition of symmetry and therefore electrically balanced. Under this condition, the grids being unexcited, each of the vacuum tubes 24 and 25 will function as a double diode with the rectifying functions of each cathode and associated anode alternating according to polarity on successive half-cycles of applied potential. Conduction in each of said tubes will thus take place symmetrically and bilaterally, and there will flow therethrough equal alternating currents in phase with, and corresponding to, the potential impressed thereon from the secondary winding of the transformer 33. Though the control grids of the tubes 24 and 25, when unexcited from an external source, are nominally at a common potential, there will circulate through said grids and associated connections including the resistors 30 and 40 a small current having both unidirectional and alternating components. The portion of this current which flows through the resistor 40 connected between the conductors 31 and 37 will develop thereacross a potential providing a desirable grid bias and improving the continuity of current flow through whichever of the tubes 24—25 is conductive. The capacitor 41 in parallel with the resistor 40 will serve to minimize the voltage drop due to the varying component of said current, and correspondingly reduce pulsations in the grid bias. Since the vacuum tubes 24 and 25 are connected in parallel, with respect to the transformer 33, the currents through them will be in phase, so that there will exist no alternating potential between the conductors 19—20 or between the conductors 21—22. Thus, no current will flow in either of the primary windings of the transformer 44, and no potential will be induced in its secondary winding.

It may now be assumed that there is impressed upon the terminals 28 and 29 a unidirectional potential, the terminal 28 being made positive, and the terminal 29 negative, with respect to the conductor 31 connected to the mid-point of the resistor 30. The control grid of tube 24 will thus tend to assume a positive, and that of tube 25 a negative, potential with respect to other electrodes in said tubes. Considering each section of the tube 24 as a grid-controlled rectifier, the positive potential of the grid with respect to the cathode and anode will tend to increase the flow of current therethrough during that half-cycle of the applied alternating potential during which the anode is positive with respect to the cathode. Since the two sections of the tube are connected with mutually opposed polarity, each section will carry said increased current for a corresponding half-cycle, with the result that the net current carried by said tube will be symmetrically alternating, and will increase in magnitude with the positive potential of the grid in relation to associated electrodes. In a similar manner, in the tube 25, the negative potential of the grid with respect to the other electrodes will tend to decrease the value of alternating current flowing through said last-named tube below that corresponding to the above-described condition of balance. Thus, when the potential of the terminal 28 is positive with respect to that of terminal 29 there will flow through the path including the tube 24 and the resistors 11 and 14 an alternating current in phase with, but of greater magnitude than, that flowing through the parallel path including the tube 25 and the resistors 12 and 15. There will consequently be developed between the conductors 19 and 20 an alternating electromotive force, which will be impressed upon the terminals of the primary winding of the transformer 44 connected between said conductors, while a similar electromotive force will be developed between the conductors 21 and 22 and impressed upon the corresponding primary winding of said transformer. The polarities of said primary windings being so selected as to produce additive magnetic effects upon the transformer core, it will be apparent that there will be induced in the secondary winding an electromotive force varying in intensity with the magnitude of the unidirectional potential applied between the terminals 28—29. At the same time, the similar primary coils wound upon a common magnetic circuit will tend to equalize the alternating potentials in the portions of the network across which they are connected, thus compensating for inequalities in the performance of the electron tubes.

Since neither the bridge network nor the transformer 44 contains any reactive element or means affecting the symmetry of the wave, the induced electromotive force will (according to polarities of the connections) be either substantially in phase with, or 180 electrical degrees removed from, the voltage of the supply 36. It will further be apparent that a reversal of polarity of the unidirectional potential impressed upon the terminals 28—29, making the grid of the tube 25 positive with respect to that of the tube 24, will cause the alternating current flowing through the latter tube to become of less value than that in the former, with a corresponding reversal of phase in the currents flowing in the two primary windings of the transformer 44, and a consequent 180-degree phase-shift in the voltage appearing at the output terminals 45—46. The network comprising the resistor 40 and the capacitor 41 connected in parallel between the mid-point of the resistor 30 and that of the secondary winding of transformer 33 provides a desirable bias for the control grids in the electron tubes 24 and 25 and functions in a manner identical with the corresponding combination in a conventional signal bias circuit.

Experience with the circuit as herein disclosed has shown that, by virtue of operating grid controlled tube combinations of bilateral conductivity in a balanced circuit, it becomes possible to reduce the cathode emission materially below normal characteristics wthout loss of over-all sensitivity, and with marked advantages in performance characteristics. The reasons for the observed improvement would appear to lie primarily in the reduction of space charge about the cathodes. It is a well known fact that as the filament or cathode temperature of a triode is increased the emission becomes greater, with a correspondingly increased space charge, which has been found to reach a value as high as 80 millivolts. Since the potential differences to whose detection and measurement the present circuit is especially adapted are likely to lie in ranges of this order of magnitude, the presence of an inherent bias of such value would seriously inhibit utilization of the circuit. It has been found that by exciting the filaments at half rated voltage (thereby heating the cathodes to a temperature much less than half their normal rise above atmospheric, and, in general, below the visible spectrum) the objectionable features of space charge disappear, and the system performs with a sensitivity of response greater than with the cathodes operated at normal temperature.

It is a known fact that, because of the erratic, fortuitous, and unpredictable nature of electron emission from highly heated surfaces, and the consequent variations of space-charge potential characterizing uncontrolled cathodes, conventional circuits utilizing vacum tubes with unidirectional grid potentials of low value in relation to said space-charge potentials are subject to objectionable "drift" or instability in operation, so that a network operating from a reference condition of balance will require that said balance be subject to continual surveillance and readjustment. The principle of the present invention, wherein, as previously stated, grid-controlled vacuum tube elements of bilateral conductivity are combined in a bridge network with fixed resistors, making it possible to operate said tube elements with relatively cool cathodes without loss of over-all sensitivity, eliminates the effects of space-charge potentials. Thus, the phenomenon of "drift" which heretofore has inhibited the use of grid-controlled tubes where the grid potential is unidirectional and of small magnitude is reduced to a minimum, and the network rendered suitable to the detection and measurement of potential differences approaching, and passing through, a zero magnitude.

Though the network embodying the principles of the invention has been set forth as utilizing two double-triode tubes 24 and 25, each having a single control grid, it will be obvious that each of said tubes may be replaced by a pair of single triodes, as 50 and 51 in Fig. 2, for which purpose each of said tubes should possess such characteristics as will enable it to be operated as a grid-controlled rectifier. Such a tube is found in that form having the trade designation "6J5." As has already been pointed out, the functions of the four single triodes or the two double triodes 24 and 25 can be incorporated in a quadruple triode, as shown in Fig. 3, where two pairs of cathode-anode combinations are enclosed in a common envelope, with a separate control grid for each pair.

The operation of the self-balancing potentiometer-type thermocouple pyrometer shown in Fig. 4 is as follows: Current from the battery 62 flowing in the slide-wire 61 having been adjusted by the rheostat 63 to a predetermined reference value, whereby to establish a predetermined potential drop over the extended length of said slide-wire, and the thermo-electromotive force developed in the thermocouple 71 being impressed across a portion of said slide-wire, as determined by the position of the sliding contact 64, any difference of potential between that of said couple and that of the included portion of the slide-wire will be impressed upon the input terminals 28—29 of the bridge-inverter network 10. This potential difference varying, of course, in polarity and in magnitude with the direction and degree of unbalance, will, according to the principles hereinbefore fully set forth, cause to be developed across the output terminals 45—46 an alternating voltage varying in magnitude and in phase-polarity with respect to the applied alternating voltage according to the corresponding characteristics of the unbalance potential. The output voltage of the network 10 is impressed upon the input terminals of the amplifier 73, whereby there is applied to the winding 70 of the motor 68 an alternating potential varying in magnitude and in phase direction with respect to the current in the winding 69 according to the degree and direction of unbalance between the thermocouple voltage and the slide-wire potential. The motor 68 will thus be rendered operative; and, by proper selection of polarities with respect to rotational directions, said motor may be caused to shift the sliding contact 64 along the resistor 61 always in such a sense as to restore a balanced condition in the potentiometer network. The index or pointer 66, showing on the graduated scale 67 an indication of the translated position of the contact 64, will thus provide a measure of the temperature to which the thermocouple 71 is exposed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. An electrical network comprising a source of alternating current, two similar circuits connected in parallel across said source, each circuit including in series a portion having fixed nonreactive conductance and a portion comprising a space path of variable bilateral conductance, means for varying the conductance of one of said space paths differently from that of the other in correspondence with changes in a magnitude to be measured, and means responsive to the alternating potential difference between points correspondingly located on said two circuits to provide a measure of said magnitude.

2. An electrical network comprising a source of alternating current having two terminals, two similar circuits connected in parallel between said terminals, each of said circuits including two portions of constant conductance connected in series and having between them a portion comprising a space path of variable bilateral conductance, the constant conductance portions of said respective circuits connected to one of said terminals forming a first pair of substantially equal conductance value and those connected to the other of said terminals a second pair of substantially equal value, means for simultaneously varying the conductance of said respective space paths in opposite senses in response to changes in a variable magnitude, and a transformer having two primary windings respectively connected to said pairs of constant conductance paths, and a single secondary winding responsive to the joint influence of said primaries to produce an alternating potential variable with said magnitude.

3. An electrical network comprising a source of alternating current having two terminals, two similar circuits connected in parallel between said terminals, each of said circuits including two portions of constant conductance connected in series and having between them a portion comprising a space path of variable bilateral conductance, the constant conductance portions of said respective circuits connected to one of said terminals forming a first pair of substantially equal conductance value and those connected to the other of said terminals a second pair of substantially equal value, means for simultaneously varying the conductance of said respective space paths in opposite senses in response to changes in a variable magnitude, and a transformer having two similar windings symmetrically connected to said pairs of constant conductance paths in a sense to equalize the alternating potentials therein, and a further winding responsive to the joint influence of said two windings to produce an alternating potential variable with said magnitude.

4. A bridge-type inverter system comprising four electron-emissive devices each having an anode, a cathode, and a control grid, said devices being arranged in pairs in each of which the control grids are interconnected and the cathode of each device and the anode of its mate are connected to a common terminal, a bridge network having four resistance units, each of said units being connected at one point to an individual one of said common terminals and at another point to a corresponding point on another of said resistance units, means for applying between said last-named points an alternating potential, means for applying between the respective inter-connected control grids of each pair of devices a unidirectional potential, and means for deriving from said common terminals an alternating potential variable in magnitude with changes in said unidirectional potential.

WILLIAM F. ERTZMAN.

REFERENCES CITED

The following references are of record in the file of this patent:

UNITED STATES PATENTS

| Number | Name | Date |
| --- | --- | --- |
| 1,893,780 | Lyman | Jan. 10, 1933 |